(12) United States Patent
Cheung et al.

(10) Patent No.: US 9,106,464 B2
(45) Date of Patent: *Aug. 11, 2015

(54) TRACE CANCELLER WITH EQUALIZER ADJUSTED FOR TRACE LENGTH DRIVING VARIABLE-GAIN AMPLIFIER WITH AUTOMATIC GAIN CONTROL LOOP

(71) Applicant: Pericom Semiconductor Corporation, Milpitas, CA (US)

(72) Inventors: Hung-Yan Cheung, Hong Kong (HK); Michael Y. Zhang, Palo Alto, CA (US)

(73) Assignee: Pericom Semiconductor Corp., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,563

(22) Filed: Jan. 28, 2014

(65) Prior Publication Data

US 2014/0140386 A1    May 22, 2014

Related U.S. Application Data

(63) Continuation of application No. 12/902,296, filed on Oct. 12, 2010, now Pat. No. 8,675,714.

(51) Int. Cl.
*H03K 11/00* (2006.01)
*H04L 25/60* (2006.01)
(Continued)

(52) U.S. Cl.
CPC ......... *H04L 25/03885* (2013.01); *H04B 3/146* (2013.01); *H04B 3/466* (2013.01); *H04L 25/0264* (2013.01); *H04L 25/03878* (2013.01)

(58) Field of Classification Search
CPC ............ H04L 27/2624; H04L 27/2623; H04L 25/03878; H04L 27/2608; H04L 27/2647
USPC ................. 375/211–215, 219–236, 259, 285, 375/286–288, 295–297; 379/338, 340, 379/347–348
See application file for complete search history.

(56) References Cited

U.S. PATENT DOCUMENTS 6,741,644 B1    5/2004 Dehghan et al.
6,882,466 B1    4/2005 Shimojoh et al.
(Continued)

OTHER PUBLICATIONS

US Office Action mailed Aug. 13, 2013, for U.S. Appl. No. 12/902,296.

(Continued)

*Primary Examiner* — Sam K Ahn
*Assistant Examiner* — James M Perez
(74) *Attorney, Agent, or Firm* — Weaver Austin Villeneuve & Sampson LLP (57) ABSTRACT

Distortions of both amplitude and phase along a transmission line are compensated for by a trace canceller inserted between a transmitter and a receiver. The trace canceller has an equalizer that compensates for a trace length between the transmitter and the trace canceller. A variable gain amplifier between the equalizer and an output buffer has its gain controlled by an automatic gain control circuit that compares low-frequency swings of the input and output of the trace canceller. The gain of the variable gain amplifier is reduced to prevent the output buffer from saturating and clipping peak voltages on its output. Thus both the variable gain amplifier and the output buffer remain in the linear region. Training pulses from the transmitter are passed through the trace canceller without clipping of peak voltages, allowing the transmitter and receiver to adjust transmission parameters to best match the transmission line.

19 Claims, 6 Drawing Sheets

(51) Int. Cl.
*H04L 25/64* (2006.01)
*H04L 25/03* (2006.01)
*H04B 3/14* (2006.01)
*H04B 3/466* (2015.01)
*H04L 25/02* (2006.01)

(56) References Cited

U.S. PATENT DOCUMENTS

| | | | |
|---|---|---|---|
| 7,158,587 B2 | 1/2007 | Yang et al. | |
| 7,633,354 B2 | 12/2009 | Kuijk et al. | |
| 7,822,111 B2 | 10/2010 | Sohn et al. | |
| 7,831,005 B2 | 11/2010 | Kuwata | |
| 7,912,161 B2 | 3/2011 | Nicolescu et al. | |
| 7,915,923 B1 | 3/2011 | Yeung et al. | |
| 8,014,471 B2 | 9/2011 | Tonietto et al. | |
| 8,055,137 B2 | 11/2011 | Wang et al. | |
| 8,058,918 B2 | 11/2011 | Keady et al. | |
| 8,199,864 B1 | 6/2012 | Kim et al. | |
| 8,351,560 B2 | 1/2013 | Buchwald et al. | |
| 8,362,813 B2 | 1/2013 | Yeung et al. | |
| 8,472,897 B1* | 6/2013 | Yang | 455/114.3 |
| 8,483,266 B2 | 7/2013 | Abel et al. | |
| 8,675,714 B2* | 3/2014 | Cheung et al. | 375/214 |
| 2002/0121937 A1* | 9/2002 | Marutani et al. | 331/1 A |
| 2004/0096004 A1 | 5/2004 | Wang | |
| 2004/0131058 A1* | 7/2004 | Ghiasi | 370/389 |
| 2004/0252754 A1 | 12/2004 | Wood et al. | |
| 2006/0182171 A1* | 8/2006 | Kuijk et al. | 375/229 |
| 2007/0237468 A1* | 10/2007 | Aronson et al. | 385/100 |
| 2009/0116639 A1 | 5/2009 | Zimmerman et al. | |
| 2009/0128239 A1* | 5/2009 | Kuijk et al. | 330/254 |
| 2010/0172450 A1* | 7/2010 | Komaili et al. | 375/345 |
| 2010/0194478 A1* | 8/2010 | Maillard | 330/254 |
| 2012/0201289 A1 | 8/2012 | Abdalla et al. | |
| 2012/0202440 A1* | 8/2012 | Fudaba et al. | 455/114.2 |

OTHER PUBLICATIONS

Notice of Allowance for U.S. Appl. No. 12/902,296 mailed Oct. 29, 2013.

* cited by examiner

FIG. 2

PRIOR ART

TRACE CANCELLER WITH EQUALIZER ADJUSTED FOR TRACE LENGTH DRIVING VARIABLE-GAIN AMPLIFIER WITH AUTOMATIC GAIN CONTROL LOOP

RELATED APPLICATION DATA

The present application is a continuation of and claims priority under 35 U.S.C. 120 to U.S. patent application Ser. No. 12/902,296 for Trace Canceller With Equalizer Adjusted for Trace Length Driving Variable-Gain Amplifier With Automatic Gain Control Loop filed on Oct. 12, 2010, the entire disclosure of which is incorporated herein by reference for all purposes.

FIELD OF THE INVENTION

This invention relates to transmission-line drivers, and more particularly to trace-canceling drivers.

BACKGROUND OF THE INVENTION

Transmission lines are difficult to drive with integrated circuit (IC) buffers. The relatively small size of the IC transistors produce a limited amount of current to drive the relatively long transmission line. As IC devices shrink, the length of transmission lines tend to remain constant, increasing the relative mis-match. Also, higher speed transitions are more prone to undesirable effects such as distortion and ringing.

Figure 1A:
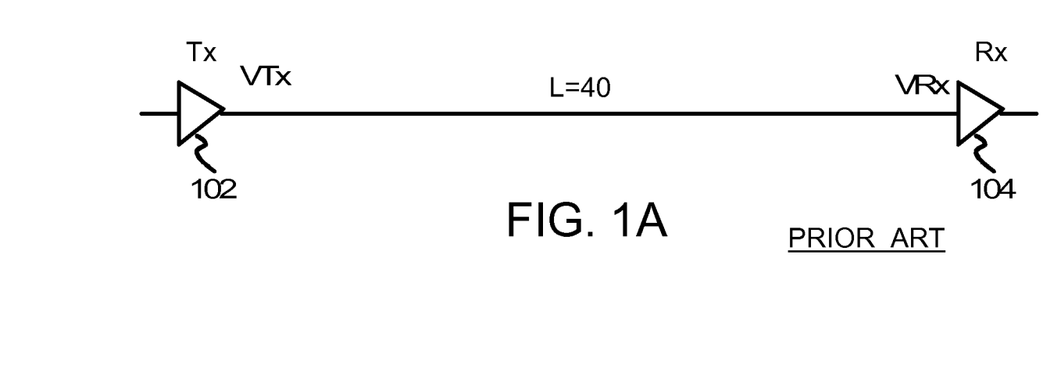
FIG. 1A shows a prior art transmission line.

FIG. 1A shows a prior art transmission line. The transmission line is 40 inches long in this example. Transmitter 102 drives transmission voltages VTx onto the near end of the transmission line. Signals caused by transitions of VTx travel down the transmission line and reach receiver 104 as received voltages VRx. The relatively long length of the transmission line causes distortions in the received signals, such the attenuation of high frequency pulses being larger than the attenuation of low frequency pulses, and the signal delay differs for different frequencies. Thus both amplitude and phase distortion occur at the received voltage VRx.

Figure 1B:
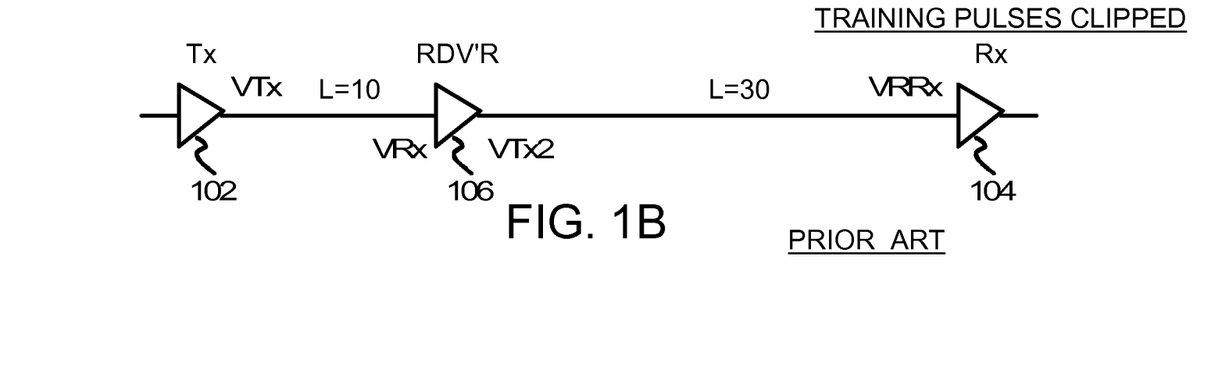
FIG. 1B shows a redriver placed on the transmission line.

In FIG. 1B, a redriver is placed on the transmission line. Redriver 106 is placed midway on the transmission line, about 10 inches from transmitter 102 and 30 inches from receiver 104 in this example. Redriver 106 can cancel phase distortion due to the transmission line between 102 and 106. Hence redriver 106 can extend the total allowable distance between the 102 and 104.

Redriver 106 normally has a non-linear limiting amplifier that has a fixed or limited output swing. The pulse with different frequencies that is transmitted by redriver 102 may not the have same swing because of the pre-emphasis or de-emphasis setting. However, the signal VRx received by redriver 106 from transmitter 102 is amplified by non-linear redriver 106, and the maximum voltage of all frequencies is often reached, causing voltages to be limited or clipped on the output of redriver 106, signal VTx2. This means that the output amplitude of the pulse with different frequencies at the output of redriver 106 is the same or similar and the swing at the output of redriver 106 is independent of the input swing. Hence, the input amplitude information is lost.

Transmitter 102 may send a training sequence of pulses or other signals on VTx to receiver 104. The amplitude of the transmitted signal from transmitter 102 may be varied during training to determine the optimal amplitude to use. Other transmission characteristics may also be varied during training, such as an amount of pre-emphasis or de-emphasis, signal frequency, etc.

During the training sequence, the distortion caused by the transmission line is detected by receiver 104, and transmitter 102 may adjust its transmission characteristics, such as output swing, pre-emphasis/de-emphasis, signal frequency and signal pattern. However, when redriver 106 is inserted between transmitter 102 and receiver 104, these training pulses may be clipped by the voltage-limiting amplifier in redriver 106. Thus the amplitude sent by transmitter 102 may be limited or clipped by redriver 106, causing receiver 104 to receive training pulses at VRRx with clipped peaks or other distortions introduced by redriver 106.

Figure 2:
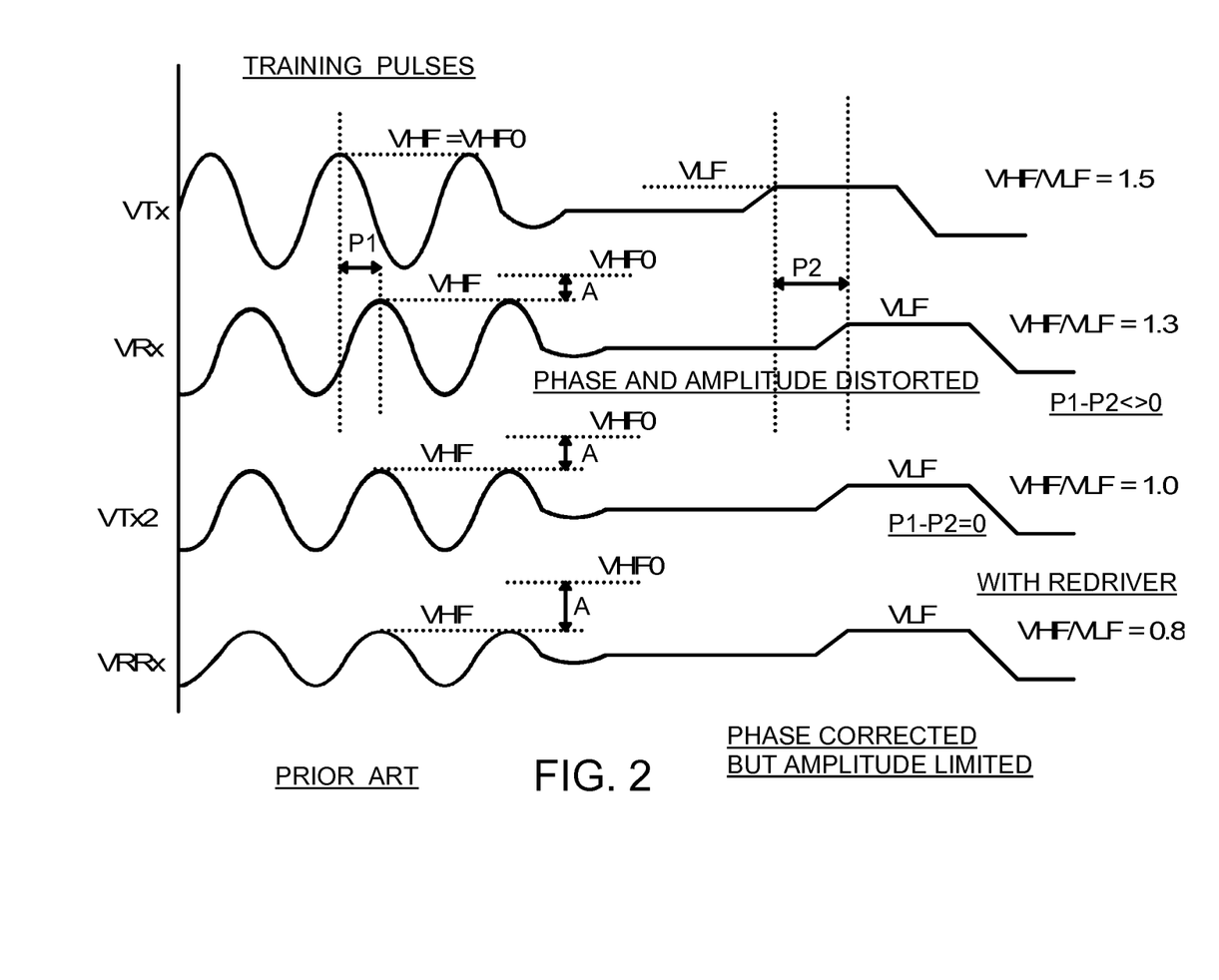
FIG. 2 is a waveform diagram of simplified training pulse on a transmission line.

FIG. 2 is a waveform diagram of simplified training pulse on a transmission line. Transmitter 102 sends training pulses as variations in voltage VTx. Typically, the insertion loss of the transmission line is proportional to the frequency, so the amplitude at higher frequencies is normally less than the amplitude at lower frequencies. To compensate for this effect, transmitter 102 increases the drive current at higher frequencies, causing the near-end voltage VHF for high frequency to be larger than the near-end voltage for low frequency VLF. Thus transmitter 102 boosts the output amplitude at high frequency (VHF) relative to that of low frequency (VLF). For example, transmitter 102 may increase the amplitude by 50% at high frequency, so that the ratio of VHF/VLF=1.5, as measured at the output of transmitter 102, transmitted voltage VTx.

The received voltage VRx at the far end of the transmission line that is input to receiver 104 has a reduced amplitude due to losses on the transmission line. Thus VHF is reduced by a factor A at receiver 104. Also, the ratio of VHF/VLF is reduced to about 0.6 because the optimum trace length for transmitter 102 is 30 inches, for this example. Thus while ratio of high and low frequency amplitude is 1.5 at the output of transmitter 102, it falls to a ratio of 0.6 at the input to receiver 104.

In addition to a reduction in amplitude along the length of the transmission line at high frequencies, phase also distorted. The phase delay of the received signal VRx is dependent on the signal frequency, which is due to capacitive and other loading effects of the transmission line. For example, the phase delay at high frequency P1 may be smaller than the phase delay at lower frequency P2, when measured at the input to redriver 106, signal VRx.

When redriver 106 is inserted between transmitter 102 and receiver 104, the input to redriver 106 is voltage VRx. Phase distortions are reduced by redriver 106, so that P1 is about equal to P2 on the output from redriver 106, signal VTx2, but amplitude distortions remain. Hence, the ratio of VHF/VLF is about 0.8 (less than 1.0) at the VRRx input of receiver 104 even though transmitter 102 can drive VTx to an optimum of 30 inches of trace length, and redriver 106 can restore the phase distortion due to 10 inches of transmission line.

What is desired is a trace canceller that does not limit amplitude. A trace canceller that is inserted on a transmission line between a transmitter and a receiver is desired to cancel trace distortions of both phase and amplitude.

DETAILED DESCRIPTION

The present invention relates to an improvement in transmission line drivers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
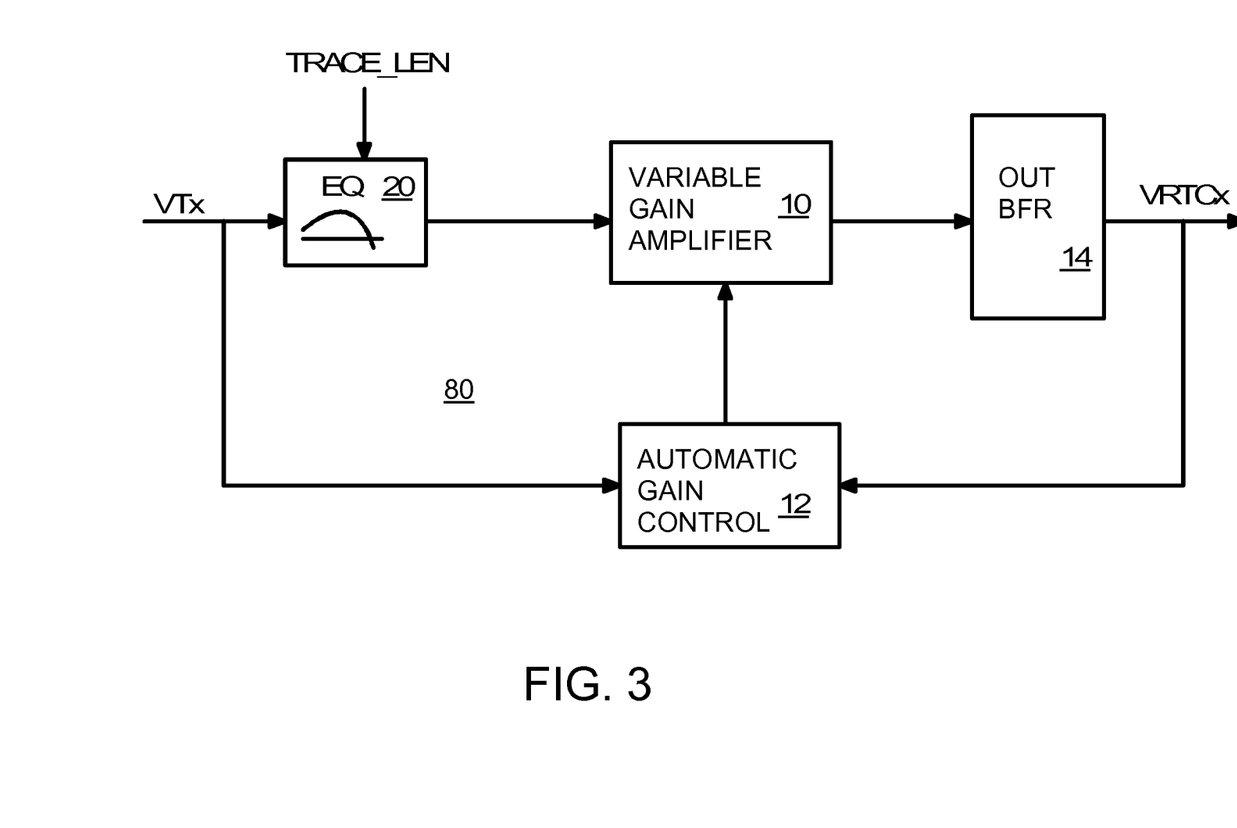
FIG. 3 is a block diagram of a trace canceller for a transmission line.

FIG. 3 is a block diagram of a trace canceller for a transmission line. Both phase and amplitude distortions are cancelled by the trace canceller. Trace canceller 80 of FIG. 3 can replace redriver 106 of FIG. 1B.

The gain parameter input to variable gain amplifier 10 is adjusted by automatic gain control 12 in response to the difference of the low frequency swing between the input and output of the trace canceller circuit. Equalizer 20 compensates for phase and amplitude distortions on the transmission line from transmitter 102. Output buffer 14 is prevented from leaving its linear region to prevent waveform clipping or voltage limiting. The gain of variable gain amplifier 10 is reduced by automatic gain control 12 for larger swings of the input voltage, preventing amplifier or output buffer saturation.

An input from transmitter 102 (FIG. 1B) VTx is applied to equalizer 20. Equalizer 20 compensates for phase and amplitude distortions on the transmission line from transmitter 102. The trace length is input to equalizer 20 as a parameter that adjusts the degree or strength of equalization produced by equalizer 20.

The equalized output from equalizer 20 is input to variable gain amplifier 10. Variable gain amplifier 10 amplifies the equalized signal from equalizer 20 and drives an amplified signal to output buffer 14. Output buffer 14 then drive the remainder of the transmission line to receiver 104 (FIG. 1B). Voltage VRTCx is the far-end voltage of the transmission line at the input to receiver 104.

The output of output buffer 14 is compared to the input to equalizer 20 by automatic gain control 12. The gain parameter input to variable gain amplifier 10 is adjusted by automatic gain control 12 in response to the difference of the low frequency swing between the input and output of the trace canceller circuit. When the amplitude of the output from output buffer 14 is larger than the input to equalizer 20, automatic gain control 12 decreases the gain parameter to variable gain amplifier 10, causing variable gain amplifier 10 to reduce amplification and thus reduce the amplitude of the output from output buffer 14.

When the amplitude of the output from output buffer 14 is less than the input to equalizer 20, automatic gain control 12 increases the gain parameter to variable gain amplifier 10, causing variable gain amplifier 10 to increase amplification and thus increase the amplitude of the output from output buffer 14. Automatic gain control 12 can have a low-pass filter to smooth out variations in amplitude over many cycles.

Output buffer 14 is a linear output buffer, as long as its input and output voltages swings stay within a limited or designed range. Large voltage swings could cause distortions by output buffer 14. These large voltage swings are prevented by careful control of the voltage amplification factor or gain of variable gain amplifier 10.

Variable gain amplifier 10 is a linear amplifier and thus does not distort the signal, as long as variable gain amplifier 10 operates within the limited/designed range. Automatic gain control 12 compares the low-frequency swings of the output of output buffer 14 to the low-frequency swings of the input to equalizer 20. Thus automatic gain control 12 ensures that the gain of variable gain amplifier 10 is set to an optimum value which ensures that the low frequency swing at the output of output buffer 14 is about the same as that at the input of equalizer 20.

Since output buffer 14 is prevented from leaving its linear region and the swing at the input of equalizer 20 is within the designed range, waveform clipping or voltage limiting does not occur. The gain of variable gain amplifier 10 is reduced by automatic gain control 12 for larger swings of the input voltage, preventing amplifier or output buffer saturation. Waveforms are shrunk in amplitude to prevent saturation. Thus the trace canceller is operating in the designed condition; both phase and amplitude distortions due to the trace can been cancelled and the length of the transmission line that can be cancelled is defined by the parameters of the equalizer setting.

Figure 4:
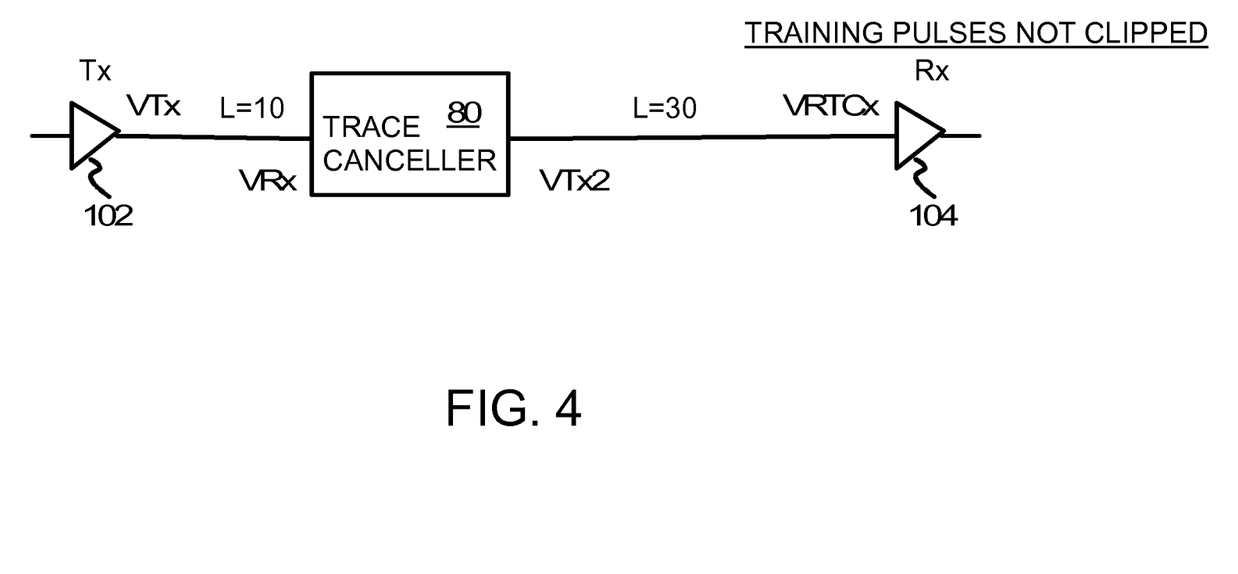
FIG. 4 shows a trace canceller placed on the transmission line.

FIG. 4 shows a trace canceller placed on the transmission line. Trace canceller 80 is placed midway on the transmission line, about 10 inches from transmitter 102 and 30 inches from receiver 104. By setting the equalizer control parameter input to equalizer 20 to 10 inches, the effect of 10 inches transmission line has been cancelled. Thus the optimum transmission length that can be driven by transmitter 102 is 40 inches rather 30 inches.

Trace canceller 80 does not have a non-linear limiting amplifier, so its output voltage is not limited or clipped. Instead, automatic gain control 12 continuously adjusts the gain of variable gain amplifier 10 so that the amplitude does not reach a maximum limit. Since clipping does not occur, the input information is not lost or approximated. Training pulses are not clipped or destroyed by trace canceller 80. Receiver 104 receives full training pulses without clipped peaks or other distortions introduced by redriver 106.

Transmitter 102 drives signal VTx onto the first segment of the transmission line, which inputs signal VRx to trace canceller 80. Trace canceller 80 then drives signal VTx2 onto the second segment of the transmission line, which is received by receiver 104 as signal VRTCx.

Figure 5:
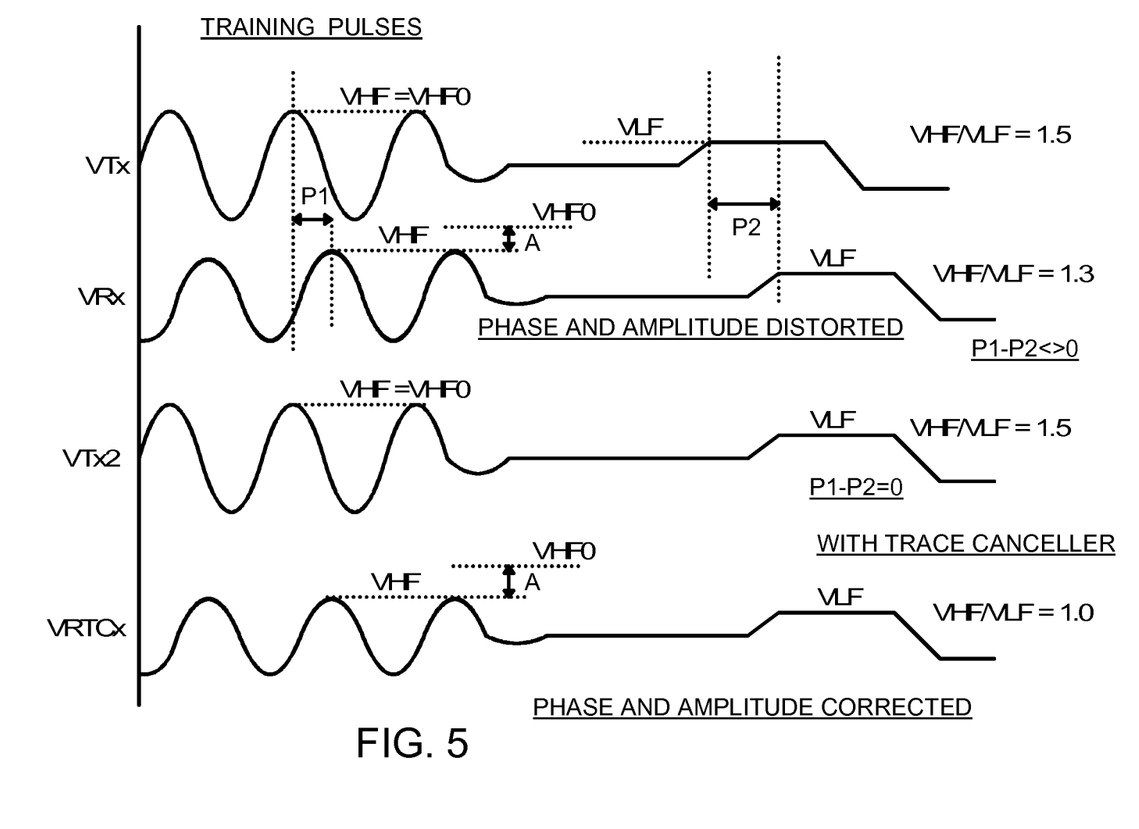
FIG. 5 is a waveform diagram of simplified training pulse on a transmission line when a trace canceller is used to cancel phase and amplitude distortions.

FIG. 5 is a waveform diagram of simplified training pulse on a transmission line when a trace canceller is used to cancel phase and amplitude distortions. Transmitter 102 (FIG. 4) sends training pulses as variations in voltage VTx. At high frequency, the maximum or peak voltage is VHF. Typically, the insertion loss of the transmission line is proportional to the frequency, so the amplitude at higher frequencies is normally smaller than the amplitude at lower frequencies.

To compensate for this effect, transmitter 102 increases the drive current at higher frequencies, causing the near-end voltage VTx to be artificially boosted. Thus transmitter 102 boosts the output amplitude at high frequency relative to that of low frequency. For example, transmitter 102 may increase the amplitude by 50% at high frequency, so that the ratio of VHF/VLF=1.5, as measured at the output of transmitter 102, transmitted voltage VTx.

The received voltage VRx (at the input to trace canceller 80) at the far end of the first segment of the transmission line has a reduced amplitude due to losses on the transmission line. Thus VLF is reduced by a factor A at trace canceller 80.

Also, the ratio of VHF/VLF is reduced to about 1.3 at the far end due to losses on the transmission line.

In addition to a reduction in amplitude along the length of the transmission line at high frequencies, phase also distorted. The high frequency phase loss P1 may not be equal to the low frequency phase loss P2 at the input to trace canceller 80. The delay of the received signal VRx is dependent on the signal frequency, which is relative to the loading effects of the transmission line.

Both phase distortions (P1-P2) and amplitude distortions A are reduced by the trace canceller. The ratio of VHF/VLF is restored to about 1.5 at the output of the trace canceller, signal VTx2, and the ratio of VHF/VLF is about 1.0 at the far end (VRTCx) since the trace canceller compensates for losses on the 10-inch transmission line. No voltage-limiting amplifier in used by the trace canceller, so the amplitude of the received re-driven signal VRTCx is not clipped or reduced.

Figure 6:
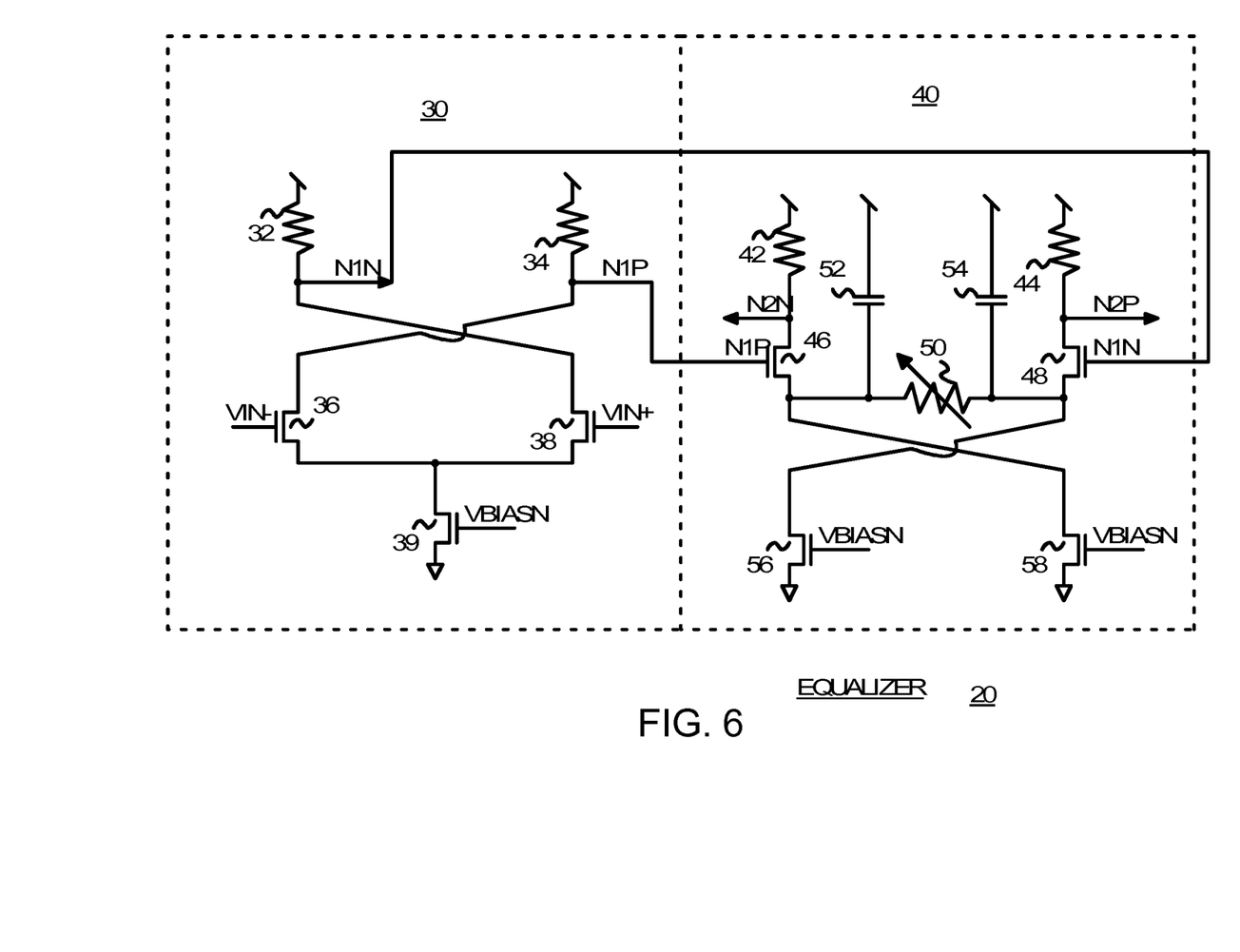
FIG. 6 is a schematic of an equalizer.

FIG. 6 is a schematic of an equalizer. Equalizer 20 receives differential input VIN+, VIN− on the gates of n-channel differential transistors 38, 36, respectively, which have their sources tied together at the drain of n-channel sink transistor 39. The drain of differential transistor 36 is signal N1P. Pull-up resistor 34 sources current to N1P.

The drain of differential transistor 38 is signal N1N. Pull-up resistor 32 sources current to N1N. Signals N1P and N1N from first equalizer stage 30 are input to second equalizer stage 40

Signal N1P is applied to the gate of n-channel differential transistor 46, while signal N1N is applied to the gate of n-channel differential transistor 48 in second equalize stage 40. N-channel sink transistor 58 is connected to the source of differential transistor 46 while n-channel sink transistor 56 is connected to the source of differential transistor 48. Sink transistors 39, 56, 58 receive a bias voltage VBIASN on their gates and have their sources connected to ground.

The drain of differential transistor 46 is signal N2N. Pull-up resistor 42 sources current to N2N. The drain of differential transistor 48 is signal N2P. Pull-up resistor 44 sources current to N2P. Signals N2P, N2N are the equalized outputs from equalizer 22 to differential multiplier 10.

Equalizing resistor 50 connects the sources of differential transistors 46, 48 and provides equalization. Capacitors 52, 54 are connected between sources of differential transistors 46, 48 and power. The values of some or all of equalizing resistor 50 and capacitors 52, 54 and VBIASN may be controlled by the equalizing control input TRACE_LEN (FIG. 3) to control the amount of attenuation of different frequency components. For example, resistor 50 may be a variable resistor with TRACE_LEN controlling its resistance value.

Alternate Embodiments

Several other embodiments are contemplated by the inventors. Many kinds of implementations of the blocks described herein could be substituted. For example other components such as capacitors, resistors, buffers, and transistors may be added. Inversions may be added using inverters or by swapping differential lines. Many choices for transistor device sizes could be made. Additional stages could be added. Many kinds of bias-voltage generators could be used, or an external bias voltage used. Input and output buffers and drivers could be added. The sensitivity and switching thresholds may be adjusted by varying ratios of transistor sizes.

Different filtering may be used, including addition of capacitors or the use of parasitic resistances and capacitances. Larger capacitance values can further smooth intra-cycle variations and prevent false triggering at cross-over when VIN+, VIN− are momentarily equal. Other kinds of amplifiers, gain controllers, output buffers, and equalizers could be substituted. The low pass filter in automatic gain control 12 may be a simple capacitor and resistor, or may be more complex. The cross-over connections in equalizer 20 shown in FIG. 6 may be deleted to have straight connections.

While single signals have been shown in some figures, such as FIG. 3, the signals may be differential signals having a pair of lines that include a true line and a complement line. The transmitter drives the complement line low when driving the true line high for a logic 1, and the transmitter drives the complement line high when driving the true line low for a logic 0. The logic values may also be inverted.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A compensation circuit, comprising:
   an equalizer configured to receive an input signal, and to variably compensate for distortion of the input signal in response to a first control signal thereby generating an equalized signal;
   a variable gain amplifier configured to receive the equalized signal from the equalizer, and to variably amplify the equalized signal in response to a second control signal thereby generating an amplified signal;
   an output buffer configured to receive the amplified signal from the variable gain amplifier and to generate an output signal in response to the amplified signal; and an automatic gain control circuit configured to receive the input signal and the output signal, and to generate the second control signal in response to low-frequency voltage swings on the input and output signals.

2. The compensation circuit of claim 1, wherein the automatic gain control circuit is further configured to generate the second control signal to prevent the amplified signal from saturating the output buffer, thereby preventing clipping of the output signal.

3. The compensation circuit of claim 1, wherein the input signal includes one or more training pulses originating from a transmitter and directed to a receiver, and wherein the compensation circuit is configured to generate the output signal without clipping of the training pulses.

4. The compensation circuit of claim 1, wherein the compensation circuit is further configured to generate the equalized, amplified, and output signals in order to compensate for one or both of phase distortion in the input signal or amplitude distortion in the input signal.

5. The compensation circuit of claim 1, wherein a value of the first control signal corresponds to a length of a transmission line by which the equalizer receives the input signal, and wherein the equalizer is further configured by the value of the first control signal to compensate for the distortion of the input signal caused, at least in part, by transmission of the input signal over the transmission line.

6. The compensation circuit of claim 1, wherein the input signal is a differential input signal, wherein the equalizer further comprises a first differential input and a second differential input that are driven to opposite states by the differential input signal, and wherein the output signal is a differential output signal.

7. The compensation circuit of claim 1, wherein the equalizer further includes one or both of a variable resistor that is configurable by the first control signal or a variable capacitor that is configurable by the first control signal.

8. A method, comprising:
receiving, with first circuitry, an input signal from a transmitter via a first transmission line;
with the first circuitry, variably compensating for distortion of the input signal in response to a first control signal thereby generating an equalized signal;
receiving, with second circuitry, the input signal and an output signal;
with the second circuitry, generating a second control signal in response to low-frequency voltage swings on the input signal and the output signal;
with third circuitry, variably amplifying the equalized signal in response to the second control signal thereby generating an amplified signal; and
with fourth circuitry, generating the output signal in response to the amplified signal for transmission to a receiver via a second transmission line.

9. The method of claim 8, wherein the second control signal is generated such that the amplified signal does not saturate the fourth circuitry, thereby preventing clipping of the output signal.

10. The method of claim 8, wherein the input signal includes one or more training pulses originating from the transmitter and directed to the receiver, and wherein the output signal is generated without clipping of the training pulses.

11. The method of claim 8, wherein the equalized, amplified, and output signals are generated in order to compensate for one or both of phase distortion in the input signal or amplitude distortion in the input signal.

12. The method of claim 8, wherein a value of the first control signal corresponds to a length of the first transmission line, and wherein the equalized signal is generated to compensate for the distortion of the input signal caused, at least in part, by transmission of the input signal over the first transmission line.

13. The method of claim 8, wherein the input signal is a differential input signal, and wherein the output signal is a differential output signal.

14. The method of claim 8, wherein variably compensating for the distortion of the input signal further includes configuring one or both of a variable resistor or a variable capacitor using the first control signal.

15. A system, comprising:
a transmitter;
a first transmission line; and
a compensation circuit, including:
an equalizer configured to receive an input signal from the transmitter via the first transmission line, and to variably compensate for distortion of the input signal in response to a first control signal thereby generating an equalized signal;
a variable gain amplifier configured to receive the equalized signal from the equalizer, and to variably amplify the equalized signal in response to a second control signal thereby generating an amplified signal;
an output buffer configured to receive the amplified signal from the variable gain amplifier, and to generate an output signal in response to the amplified signal; and
an automatic gain control circuit configured to receive the input signal and the output signal, and to generate the second control signal in response to low-frequency voltage swings on the input signal and the output signal.

16. The system of claim 15, wherein the automatic gain control circuit is further configured to generate the second control signal to prevent the amplified signal from saturating the output buffer, thereby preventing clipping of the output.

17. The system of claim 15, wherein the input signal includes one or more training pulses originating from the transmitter and directed to a receiver, and wherein the compensation circuit is configured to generate the output signal without clipping of the training pulses.

18. The system of claim 15, wherein the compensation circuit is further configured to generate the equalized, amplified, and output signals in order to compensate for one or both of phase distortion in the input signal or amplitude distortion in the input signal.

19. The system of claim 15, wherein a value of the first control signal corresponds to a length of the first transmission line, and wherein the equalizer is further configured by the value of the first control signal to compensate for the distortion of the input signal caused, at least in part, by transmission of the input signal over the first transmission line.

* * * * *